(12) United States Patent
Tung et al.

(10) Patent No.: US 11,605,328 B2
(45) Date of Patent: Mar. 14, 2023

(54) SPLIT-TYPE DISPLAY SYSTEM

(71) Applicant: AICONNX TECHNOLOGY CORPORATION, Hsinchu (TW)

(72) Inventors: Hsu-Jung Tung, Hsinchu (TW); Lien-Hsiang Sung, Hsinchu (TW); Wei-Liang Cheng, Hsinchu (TW)

(73) Assignee: AICONNX TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/352,741

(22) Filed: Jun. 21, 2021

(65) Prior Publication Data
US 2022/0084452 A1 Mar. 17, 2022

Related U.S. Application Data

(60) Provisional application No. 63/079,063, filed on Sep. 16, 2020.

(30) Foreign Application Priority Data

Mar. 4, 2021 (TW) ................................ 110107788

(51) Int. Cl.
*G09G 3/20* (2006.01)
*G06F 3/14* (2006.01)

(52) U.S. Cl.
CPC ............. *G09G 3/20* (2013.01); *G06F 3/1446* (2013.01); *G09G 2300/026* (2013.01);
(Continued)

(58) Field of Classification Search
CPC ..................... G09G 2370/025; G09G 2370/14
See application file for complete search history.

(56) References Cited

U.S. PATENT DOCUMENTS 5,101,354 A * 3/1992 Mowers .................. A63D 1/00
473/65
5,627,582 A * 5/1997 Muramoto ........... H04N 13/194
348/E7.039

(Continued)

FOREIGN PATENT DOCUMENTS

TW M536826 U 2/2017
TW I1703871 B 9/2020

*Primary Examiner* — William Boddie
*Assistant Examiner* — Bipin Gyawali
(74) *Attorney, Agent, or Firm* — McClure, Qualey & Rodack, LLP

(57) ABSTRACT

A split-type display system includes a processing device, a display device, and a transmission cable connecting the devices. The processing device includes a processing unit and a low-to-high unit. The processing unit generates a first image signal having both a first transmission rate and a first channel number. The low-to-high unit converts the first image signal into a second image signal having both a second transmission rate and a second channel number. The first transmission rate is lower than the second transmission rate. The display device includes a high-to-low unit and a display unit. The high-to-low unit receives and converts the second image signal into a third image signal having both a third transmission rate and a third channel number. The display unit displays the third image signal. a number of channels of the transmission cable is the same as the second channel number.

16 Claims, 4 Drawing Sheets

(52) U.S. Cl.
CPC ... *G09G 2330/026* (2013.01); *G09G 2360/06* (2013.01); *G09G 2370/025* (2013.01)

(56) References Cited

U.S. PATENT DOCUMENTS

| | | | |
|---|---|---|---|
| 2015/0002739 A1* | 1/2015 | Rui | H04N 21/440245 |
| | | | 348/441 |
| 2015/0054798 A1* | 2/2015 | Park | G09G 3/3685 |
| | | | 345/204 |
| 2015/0288919 A1* | 10/2015 | Labosco | H04N 19/40 |
| | | | 348/445 |
| 2016/0109934 A1* | 4/2016 | Woo | G06F 1/3265 |
| | | | 345/211 |
| 2018/0082653 A1* | 3/2018 | Wang | G09G 3/2096 |
| 2020/0275051 A1* | 8/2020 | Chiang | H04N 7/014 |
| 2020/0344740 A1* | 10/2020 | Park | H04W 4/40 |
| 2022/0351461 A1* | 11/2022 | Peuhkurinen | G09G 5/397 |

\* cited by examiner

SPLIT-TYPE DISPLAY SYSTEM

CROSS-REFERENCES TO RELATED APPLICATIONS

This application claims the benefit of U.S. provisional application Ser. No. 63/079,063, filed on Sep. 16, 2020 and claims the priority of Patent Application No. 110107788 filed in Taiwan, R.O.C. on Mar. 4, 2021. The entirety of the above-mentioned patent applications are hereby incorporated by references herein and made a part of the specification.

BACKGROUND

Technical Field

The present disclosure relates to a split-type display system.

Related Art

For a traditional display system such as a television, a host and a display screen of the television are arranged in the same enclosure. Such a configuration leads to an excessive volume of the display system. When a user installs or places the display system, the display system occupies too much space, which causes inconvenience and affects the appearance of surroundings around the position at which the display system is placed.

With the advancement of science and technology, people also have increasing demands for audio and visual effects and quality of multimedia. For example, people pursue vivid and lifelike display pictures and good experience. The picture quality and resolution of audio and image specification technologies have been improved. As high picture quality and high resolution require transmission of a huge number of signals, the efficiency of video signal transmission needs to be increased. Specifications of hardware have also been improved accordingly. Therefore, in the industry, a plurality of transmission channels are designed in a transmission cable. However, the volume of the transmission cable increases with the number of transmission channels.

SUMMARY

As described above, in order to improve the efficiency of image signal transmission and support the transmission of a huge number of signals, how to reduce excessive costs caused by an excessively thick transmission cable and avoid signal energy weakening during signal transmission caused by an excessively long transmission cable are problems urgently to be resolved.

In view of the above, in some embodiments, a split-type display system includes a processing device, a display device, and a transmission cable. The processing device includes a processing unit and a low-to-high unit. The processing unit generates a first image signal. The first image signal has a first transmission rate and a first channel number (a number of channels of the first channel). The low-to-high unit converts the first image signal into a second image signal. The second image signal has a second transmission rate and a second channel number (a number of channels of the second channel). The first transmission rate is lower than the second transmission rate, and the first channel number is greater than the second channel number. The display device includes a high-to-low unit and a display unit. The display device receives and converts the second image signal into a third image signal. The third image signal has a third transmission rate and a third channel number (a number of channels of the third channel). The display unit displays the third image signal. The transmission cable connects the low-to-high unit to the high-to-low unit, and a number of channels of the transmission cable is substantially the same as the second channel number.

DETAILED DESCRIPTION

Figure 1:
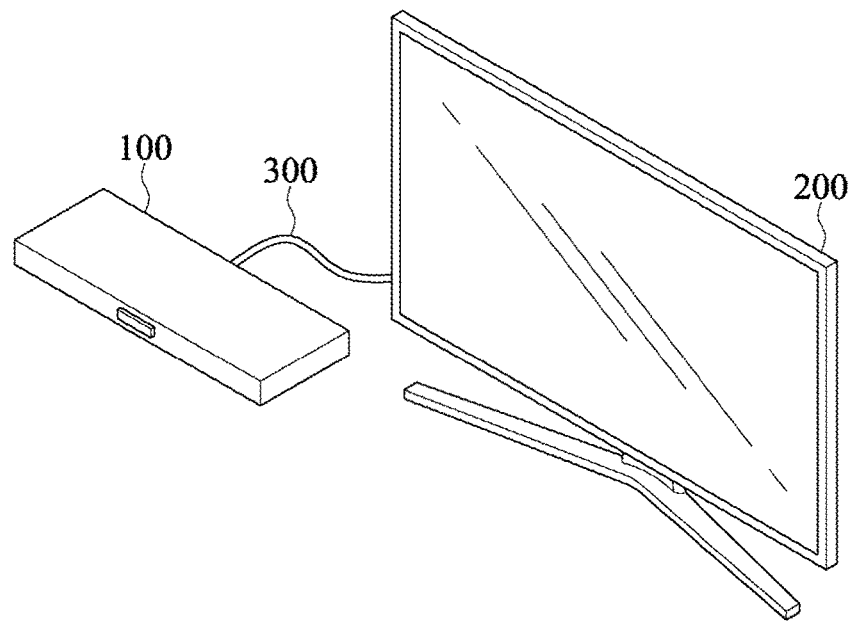
FIG. 1 is a schematic diagram of an embodiment of a split-type display system according to the present disclosure.

Referring to FIG. 1, FIG. 1 is a schematic diagram of an embodiment of a split-type display system according to the present disclosure. The split-type display system includes a processing device 100, a display device 200, and a transmission cable 300. The split-type display system is applicable to a multimedia player. For example, the separate display system is applied to a television. The display device 200 is a display screen of the television, and the processing device 100 is a host of the television. The processing device 100 may generate an image signal that is a differential signal (including a positive differential signal and a negative differential signal), and transmit the image signal to the display device 200 to display a image. However, the present disclosure is not limited to thereto. In other embodiments, the processing device 100 may also generate an image signal that is not a differential signal (such as a single-ended signal) to the display device 200 to display a image. In some embodiments, the processing device 100 generates a video signal which includes at least an image signal and at least an audio signal. The processing device 100 and the display device 200 are not designed together in one housing, that is, the processing device 100 and the display device 200 are two independent devices physically apart from each other. The processing device 100 and the display device 200 are connected to each other by a transmission cable 300. The transmission cable 300 has two connectors. One of the connectors is connected to a connector on the processing device 100, and the other connector of the transmission cable 300 is connected to a connector on the display device 200. The transmission cable 300 includes a plurality of pairs of signal transmission channels. One of each pair of the transmission channels is configured to transmit the positive differential signal of the image signal. The other of the transmission channels is configured to transmit the negative differential signal of the image signal. In this way, the processing device 100 transmits the image signal to the display device 200 through the transmission cable 300, and the display device 200 displays the image according to the image signal. A length of the transmission cable 300 may be arbitrarily designed according to a user. The processing device 100 and the display device 200 may be placed at positions spaced apart by more than a predetermined distance according to usage habits of the user and environmental space constraints. In some embodiments, the distance between the processing device 100 and the display device 200 and the length of the transmission cable 300 may be more than 50 centimeters, or even may be many meters.

Figure 2:
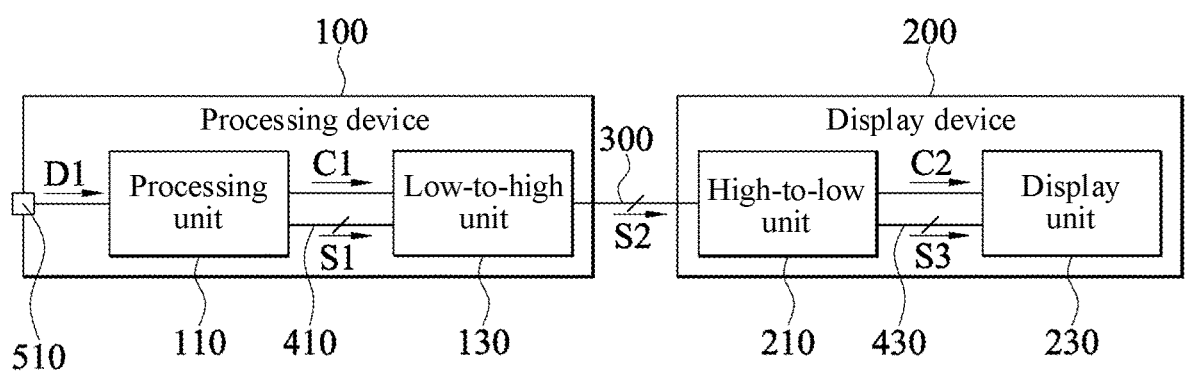
FIG. 2 is a schematic block diagram of an embodiment of the split-type display system according to the present disclosure.

Referring to FIG. 2, the processing device 100 includes a processing unit 110 and a low-to-high unit 130. The low-to-high unit 130 is coupled between the processing unit 110 and the transmission cable 300. The low-to-high unit 130 and the processing unit 110 have a plurality of pairs of transmission channels (which are referred to as a first channel 410 below, as shown in the figure, a diagonal line is drawn on the first channel 410 to represent that the first channel includes a plurality of pairs of transmission channels) therebetween. The first channel 410 is configured to transmit the image signal according to a transmission rate (which is referred to as a first transmission rate below). A communication port 510 is coupled to the processing unit 110. The communication port 510 receives image data D1 from the outside and transmits the image data D1 to the processing unit 110. The processing unit 110 generates the above image signal (which is referred to as a first image signal S1 below) according to the image data D1, and the processing unit 110 transmits the first image signal S1 to the low-to-high unit 130 through the first channel 410 according to the first transmission rate. A number of a plurality of pairs of differential signals in the first image signal S1 corresponds to a number of transmission channels in the first channel 410 (which is referred to as a first channel number in the disclosure). In other words, the first image signal S1 and the first channel 410 have the same number of channels (which is the first channel number). Each pair of transmission channels in the first image signal S1 are transmitted by each pair of transmission channels in the first channel 410.

The transmission cable 300 has a plurality pairs of transmission channels (which are referred to as a second channel below). A width of the transmission cable 300 is related to a number of second channels (which is referred to as a second channel number in the disclosure). The low-to-high unit 130 is configured to convert the transmission rate of the first image signal S1. Specifically, after the low-to-high unit 130 receives the first image signal S1, the low-to-high unit 130 converts the first image signal S1 having the first transmission rate into the second image signal S2. The second image signal S2 has a second transmission rate, and the second transmission rate is greater than the first transmission rate. The low-to-high unit 130 then transmits the converted second image signal S2 to the transmission cable 300. A number of a plurality of pairs of differential signals in the second image signal S2 corresponds to a number of transmission channels in the second channel (the second channel number). In other words, a channel number of the second image signal S2 may be the same as the second channel number of the transmission cable 300. The second image signal S2 has a second channel number, and the processing device 100 transmits the second image signal S2 having the second transmission rate to the display device 200 through the transmission cable 300. Each pair of transmission channels in the second image signal S2 are transmitted by each pair of transmission channels in the second channel. Since the second transmission rate of the second image signal S2 is greater than the first transmission rate, based on unchanged image resolution specifications and an increased transmission rate, the second channel number may be less than the first channel number, and the width of the transmission cable 300 is reduced accordingly. The reduction of the width of the transmission cable 300 leads to reduction of manufacturing costs of the transmission cable 300 and more use convenience for a user. In addition, increase of the transmission rate of the image signal on the transmission cable 300 can also avoid distortion of the image signal as a result of energy loss during transmission.

In some embodiments, after the display device 200 receives the second image signal S2, the display device 200 first reduces the transmission rate of the second image signal S2 to a transmission rate that is same as that existing before the increase, and then displays a image, but the present disclosure is not limited thereto. Alternatively, the display device 200 may reduce the transmission rate of the second image signal S2 to a transmission rate that is different from that existing before the increase, and then display the image. In detail, the display device 200 includes a high-to-low unit 210 and a display unit 230. The high-to-low unit 210 is coupled between the display unit 230 and the transmission cable 300, and the high-to-low unit 210 and the display unit 230 have a plurality of pairs of transmission channels (which are referred to as a third channel 430 below) therebetween. The third channel 430 is configured to transmit a image signal (which is referred to as a third image signal S3 below) according to a transmission rate (which is referred to as a third transmission rate below). The third transmission rate is lower than the second transmission rate, and the third transmission rate may be substantially the same as or different from the first transmission rate. After the high-to-low unit 210 receives the second image signal S2 from the transmission cable 300, the high-to-low unit 210 converts the second image signal S2 having the second transmission rate into the third image signal S3. The third image signal S3 includes a plurality of pairs of differential signals, and the third image signal S3 has the above third transmission rate. A number of a plurality of pairs of differential signals of the third image signal S3 is the same as a number of transmission channels in the third channel 430 (which is referred to as a third channel number in the disclosure). Each pair of signal components in the third image signal S3 are transmitted by each pair of transmission channels in the third channel 430. When the third transmission rate is substantially the same as the first transmission rate, the third channel number is equal to the first channel number, and the third image signal S3 is substantially the same as the first image signal S1. When the third transmission rate is different from the first transmission rate, the third transmission rate is different from the first transmission rate. The high-to-low unit 210 transmits the third image signal S3 to the display unit 230 through the third channel 430 at the third transmission rate. After receiving the third image signal S3, the display unit 230 displays a image according to the third image signal S3.

Based on this, after the first image signal S1 is converted into the second image signal S2 having a higher transmission rate through the low-to-high unit 130, the second channel number of the transmission cable 300 may be reduced, thereby avoiding inconvenience to a user and costs of the transmission cable 300 as a result of an excessively thick transmission cable 300. In addition, through the high-to-low unit 210, the second image signal S2 whose transmission rate has been increased can be converted into the third image signal S3 having the third transmission rate that is lower than the second transmission rate of the second image signal S2. In this way, the display unit 230 can display the third image signal S3 after receiving the third image signal S3.

In some embodiments, the first channel number divided by the second channel number is a ratio, and the second transmission rate divided by the first transmission rate is also the ratio. The third channel number divided by the second channel number is substantially the same as the ratio, and the second transmission rate divided by the third transmission rate is also the ratio. In other words, the channel number is inversely proportional to the transmission rate, and a multiple by which the transmission rate is increased may correspond to a multiple by which the channel number is reduced. When the second transmission rate may be twice the first transmission rate, the second channel number may be half of the first channel number. When the second transmission rate may be twice the third transmission rate, the second channel number may be half of the third channel number. However, the present disclosure is not limited to the above embodiments. In other embodiments, a ratio of the first transmission rate to the second transmission rate may be different from a ratio of the first channel number to the second channel number. A ratio of the second channel number to the third channel number may also be different from the ratio of the first channel number to the second channel number. A ratio of the second transmission rate to the third transmission rate may also be different from the ratio of the first channel number to the second channel number.

In some embodiments, for example, resolution of the first image signal S1 generated by the processing unit 110 is 4k2k and the first transmission rate is 75 MHz, the processing unit 110 transmits the first image signal S1 to the low-to-high unit 130 through the first channel 410 according to the transmission rate of 75 MHz, and the first channel number of the first channel 410 is 16 pairs. After receiving the first image signal S1, the low-to-high unit 130 converts the first image signal S1 having the transmission rate of 75 MHz into a second image signal S2 having a second transmission rate of 150 MHz, and maintains the resolution at 4k2k. The low-to-high unit 130 then transmits the second image signal S2 to the display device 200 through the transmission cable 300. Since the transmission rate is increased from 75 MHz to 150 MHz, that is, the transmission rate is doubled, the channel number of the transmission cable 300 may be halved, that is, the second channel number may be 8 pairs. After the display device 200 receives the second image signal S2 having the transmission rate of 150 MHz, the high-to-low unit 210 converts the second image signal S2 into a third image signal S3. A third transmission rate of the third image signal S3 is 75 MHz, that is, the transmission rate of the third image signal S3 is reduced to half of the second image signal S2 (reduced from 150 MHz to 75 MHz). For example, when the third transmission rate is substantially the same as the first transmission rate, the high-to-low unit 210 transmits the third image signal S3 to the display unit 230 through the third channel 430 at the transmission rate of 75 MHz, and the display unit 230 displays the third image signal S3.

In some embodiments, as shown in FIG. 2, the processing unit 110 may further generate a control signal C1. The control signal C1 is used to adjust a display effect of the display unit 230. For example, the control signal C1 may be a pulse width modulation (PWM) signal or a serial peripheral interface (SPI) signal. The PWM signal or the SPI signal may be used to adjust a display brightness of the display unit 230. In addition, the control signal C1 may also be a signal for controlling firmware update of the display unit 230. After generating the control signal C1 and the first image signal S1, the processing unit 110 transmits the control signal C1 and the first image signal S1 to the low-to-high unit 130. The control signal C1 is a low-speed signal, and a path along which the control signal is transmitted to the low-to-high unit 130 is a low-speed signal transmission channel. Therefore, the transmission path of the control signal C1 is different from the first channel 410. After the low-to-high unit 130 receives the control signal C1 and the first image signal S1, the low-to-high unit 130 merges and converts the control signal C1 and the first image signal S1 into the second image signal S2 having the second transmission rate, and then the low-to-high unit 130 transmits the converted second image signal S2 to the high-to-low unit 210 through the transmission cable 300.

After the high-to-low unit 210 receives the second image signal S2 from the transmission cable 300, the high-to-low unit 210 converts the transmission rate of the second image signal S2, and captures the second image signal S2 to obtain the control signal C2 and the third image signal S3 having the third transmission rate. The control signal C2 corresponds to the control signal C1, that is, the control signal C2 is substantially the same as the control signal C1. The high-to-low unit 210 transmits the control signal C2 and the third image signal S3 to the display unit 230. A transmission path of the control signal C2 is also different from the third channel 430, and the transmission channel of the control signal C2 is a low-speed signal transmission channel. After the display unit 230 receives the control signal C2 and the third image signal S3, the display unit 230 adjusts the display effect according to the control signal C2 and displays the third image signal S3. Alternatively, the display unit 230 may display the third image signal S3 according to the control signal C2. For example, the third image signal S3 may be an operation interface for the display unit 230 to display an adjustment of corresponding to the control signal C2, which may be used to change a backlight brightness of the display unit 230.

Figure 3:
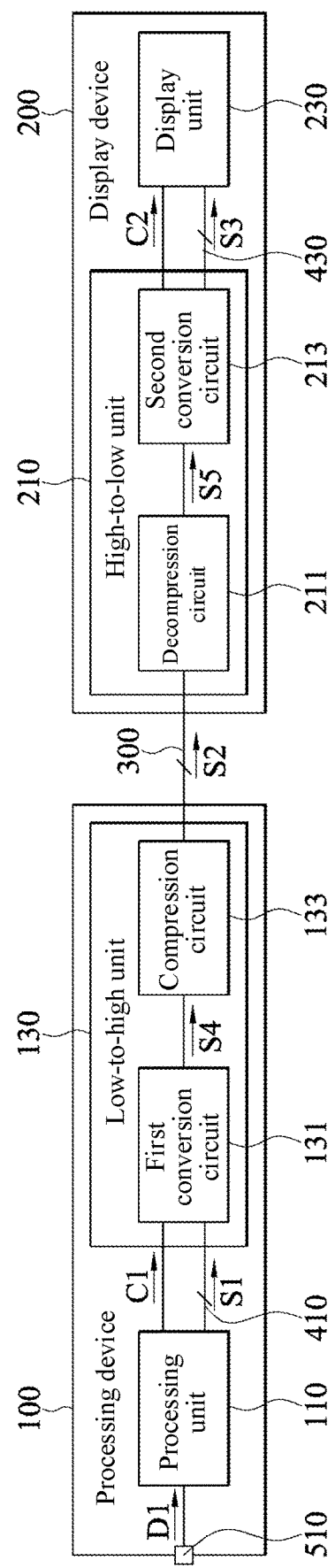
FIG. 3 is a schematic block diagram of another embodiment of the split-type display system according to the present disclosure.

In some embodiments, referring to FIG. 3, the low-to-high unit 130 includes a first conversion circuit 131 and a compression circuit 133. The first conversion circuit 131 is coupled between the processing unit 110 and the compression circuit 133, and the compression circuit 133 is coupled to the transmission cable 300. The first conversion circuit 131 and the processing unit 110 have a first channel 410 therebetween, and the compression circuit 133 and the high-to-low unit 210 have a second channel therebetween. After the low-to-high unit 130 receives the first image signal S1, the first conversion circuit 131 converts the first image signal S1 having the first transmission rate into a fourth image signal S4 having a fourth transmission rate. The fourth transmission rate is greater than the first transmission rate. The first conversion circuit 131 then transmits the converted fourth image signal S4 to the compression circuit 133. The compression circuit 133 receives the fourth image signal S4, and the compression circuit 133 compresses the fourth image signal S4 into the second image signal S2 having the second transmission rate. The transmission rate of the compressed image signal is higher than the transmission rate before compression. Therefore, the second transmission rate is greater than the fourth transmission rate and the first transmission rate.

The high-to-low unit 210 includes a decompression circuit 211 and a second conversion circuit 213. The decompression circuit 211 is coupled between the transmission cable 300 and the second conversion circuit 213, and the second conversion circuit 213 is coupled to the display unit 230. The processing device 100 and the decompression circuit 211 have a second channel therebetween, and the second conversion circuit 213 and the display unit 230 have a third channel 430 therebetween. After the display device 200 receives the second image signal S2 from the transmission cable 300, the decompression circuit 211 decompresses the second image signal S2 into a fifth image signal S5 having a fifth transmission rate. The transmission rate of the image signal after decompression is lower than the transmission rate before decompression. Therefore, the fifth transmission rate is lower than the second transmission rate. The fifth image signal S5 corresponds to the fourth image signal S4. In some embodiments, the fifth image signal S5 may be substantially the same as the fourth image signal S4, and the fifth transmission rate may be substantially the same as the fourth transmission rate, but the present disclosure is not limited thereto. Alternatively, the fifth image signal S5 may be different from the fourth image signal S4, and the fifth transmission rate may be different from the fourth transmission rate. The decompression circuit 211 transmits the decompressed fifth image signal S5 to the second conversion circuit 213, and the second conversion circuit 213 converts the fifth image signal S5 having the fifth transmission rate into the third image signal having the third transmission rate S3. The converted third transmission rate is lower than the fifth transmission rate. The second conversion circuit 213 transmits the third image signal S3 to the display unit 230, and the display unit 230 displays the third image signal S3.

In some embodiments, the processing unit 110 further transmits the generated control signal C1 to the first conversion circuit 131. A path along which the control signal C1 is transmitted to the first conversion circuit 131 is different from the first channel. After the first conversion circuit 131 receives the control signal C1 and the first image signal S1, the first conversion circuit 131 merges and converts the control signal C1 and the first image signal S1 into the fourth image signal S4 having the fourth transmission rate. In other words, the fourth image signal S4 corresponds to the control signal C1 and the first image signal S1, and the first conversion circuit 131 transmits the converted fourth image signal S4 to the compression circuit 133. The compression circuit 133 compresses the fourth image signal S4 into the second image signal S2, and the compression circuit 133 transmits the second image signal S2 to the decompression circuit 211 through the transmission cable 300.

After the decompression circuit 211 receives the second image signal S2 from the transmission cable 300, the decompression circuit 211 decompresses the second image signal S2 into the fifth image signal S5 having the fifth transmission rate. The decompression circuit 211 transmits the decompressed fifth image signal S5 to the second conversion circuit 213, and the second conversion circuit 213 converts the transmission rate of the fifth image signal S5, and captures the fifth image signal S5 to obtain the control signal C2 and the third image signal S3 having the third transmission rate. The third image signal S3 corresponds to the first image signal S1, the control signal C2 corresponds to the control signal C1, and the control signal C2 is substantially the same as the control signal C1. The high-to-low unit 210 transmits the control signal C2 and the third image signal S3 to the display unit 230. A path along which the control signal C2 is transmitted to the display unit 230 is different from the third channel. The display unit 230 adjusts the display effect according to the control signal C2 and displays the third image signal S3. Alternatively, the display unit 230 may display the third image signal S3 according to the control signal C2.

Figure 4:
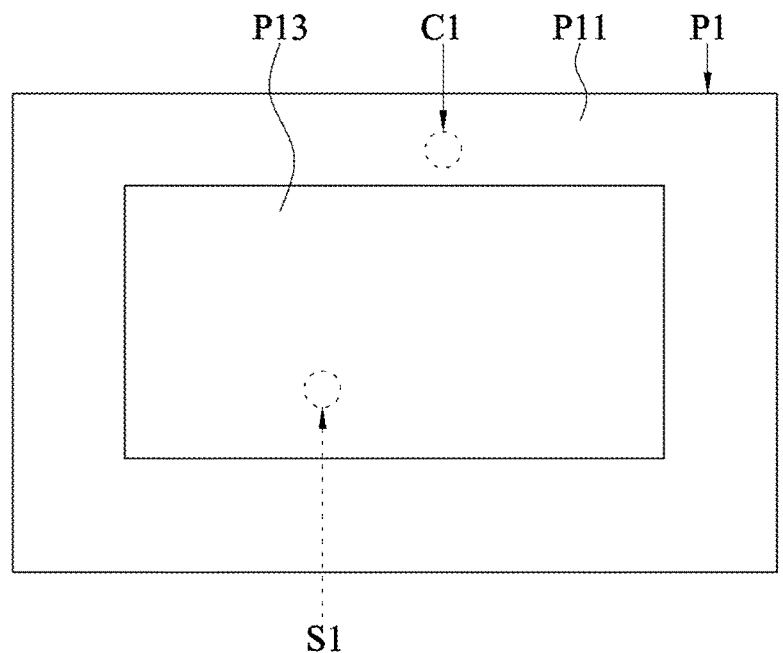
FIG. 4 is a schematic diagram of an embodiment of image information of the split-type display system according to present disclosure.

In some embodiments, the first conversion circuit 131 may merge the first image signal S1 and the control signal C1 according to a merging mode. The merging mode may be a time sharing mode, a space sharing mode, or a time and space sharing mode. In the time sharing mode, for example, the first conversion circuit 131 connects the control signal C1 to a position before the first image signal S1 or after the first image signal S1 to obtain the second image signal S2 by using a non-image area. In some embodiments, image information P1 formed corresponding to the second image signal S2 is shown in FIG. 4. A peripheral part P11 of the image information P1 includes the control signal C1, and a middle part P13 of the image information P1 includes the first image signal S1. The second conversion circuit 213 captures the peripheral part P11 of the image information P1 from the image information P1 corresponding to the second image signal S2 to obtain the control signal C2 corresponding to the control signal C1. The second conversion circuit 213 captures the middle part P13 from the image information P1 corresponding to the second image signal S2 to obtain the third image signal S3 corresponding to the first image signal S1. In other words, the display unit 230 may display the middle part P13 of a image corresponding to the second image signal S2, and the display unit 230 may control and adjust the display effect according to the peripheral part of the image. In other embodiments, the peripheral part P11 of the image may be replaced with a right half of the image, and the middle part P13 of the image may be replaced with a left half of the image, and so on. Distribution positions of the image signal and the control signal are not limited.

In some embodiments, in the space sharing mode, the first conversion circuit 131 increases a signal bit length of the first image signal S1 for example by using a least significant bit (LSB) part (increases an LSB part of the first image signal S1) and stores the control signal C1 in newly added bits of the first image signal S1 to obtain the second image signal S2. The second conversion circuit 213 obtains the control signal C2 corresponding to the control signal C1 according to a captured LSB part corresponding to the second image signal S2 and obtains the third image signal S3 corresponding to the first image signal S1 according to a remaining part.

Figure 5:
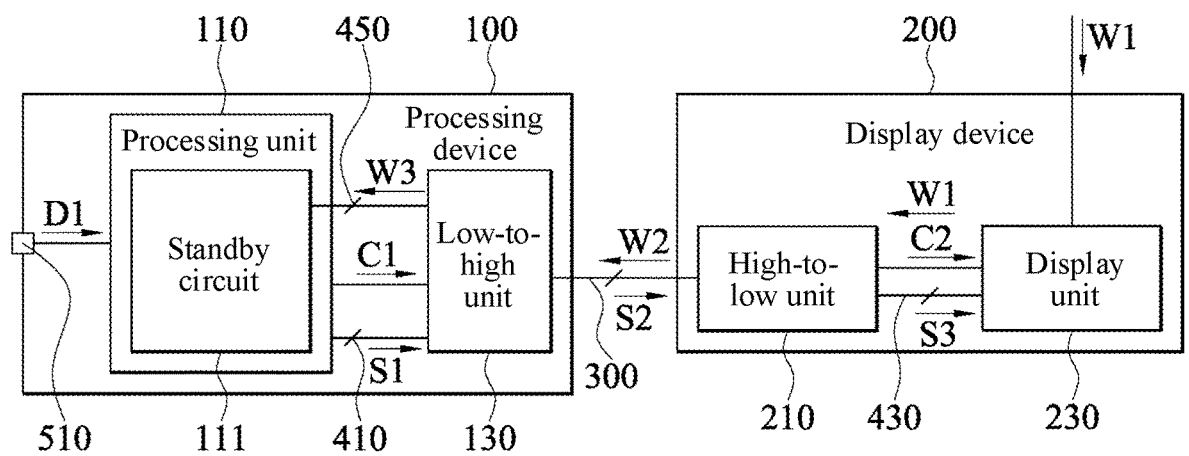
FIG. 5 is a schematic block diagram of another embodiment of the split-type display system according to the present disclosure.

In some embodiments, referring to FIG. 5, the processing unit 110 further includes a standby circuit 111. The standby circuit 111 is coupled to the low-to-high unit 130. When the display device 200 is not used by a user, some power-consuming circuits (such as a CPU circuit and a GPU circuit) in the processing device 100 may enter a sleep mode and the standby circuit 111 is in a standby state. When a user wants to use the display device 200 to activate the display device 200, the display device 200 receives a wake-up signal W1 from a controller, and the display device 200 transmits the wake-up signal W1 to the standby circuit 111. When the processing unit 110 receives the wake-up signal W1, the processing unit 110 activates the power-consuming circuits. The wake-up signal W1 may be from a WIFI antenna, a microphone, a remote control, or a button on the display device 200. In some embodiments, the display unit 230 receives at least one wake-up signal (which is referred to as a wake-up signal W1 below) from a WIFI antenna, a microphone, a remote control, or a button on the display device 200, and transmits the wake-up signals W1 from at least one different source to the high-to-low unit 210, and the high-to-low unit 210 converts the wake-up signal W1 into an integrated signal W2. The high-to-low unit 210 transmits the integrated signal W2 to the processing device 100 through the transmission cable 300. The transmission cable 300 further includes a return signal transmission channel (which is referred to as a fourth channel), and the fourth channel is configured to transmit the integrated signal W2 to the processing device 100. Compared with the second channel that transmits the second image signal S2, the fourth channel transmits the integrated signal W2 at a lower transmission rate. Therefore, the fourth channel is different from the second channel.

After the low-to-high unit 130 of the processing device 100 receives the integrated signal W2 from the transmission cable 300, the low-to-high unit 130 converts the integrated signal W2 into a trigger signal W3. The trigger signal W3 corresponds to the wake-up signals W1 from the different sources, and the low-to-high unit 130 transmits the trigger signal W3 to the standby circuit 111. The standby circuit 111 and the low-to-high unit 130 include a plurality of transmission channels (which are referred to as a fifth channel 450 below, as shown in FIG. 4) therebetween. For example, a number of transmission channels of the fifth channel 450 (which is referred to as a fifth channel number in the disclosure) may be 4, and each transmission channel corresponds to each of the different sources of the wake-up signals W1 (that is, the WIFI antenna, the microphone, the remote control, and the button on the display device 200). When the wake-up signal W1 is from the microphone, the low-to-high unit 130 transmits the trigger signal W3 to the standby circuit 111 through a transmission channel in the fifth channel corresponding to the microphone according to the fact that the wake-up signal W1 is from the microphone. Alternatively, when the wake-up signal W1 is from the remote control, the low-to-high unit 130 transmits the trigger signal W3 to the standby circuit 111 through a transmission channel in the fifth channel corresponding to the remote control according to the fact that the wake-up signal W1 is from the remote control. Descriptions corresponding to the WIFI antenna, the button on the display device 200, or other sources may be obtained by analogy, and details are not described herein again. The standby circuit 111 wakes up the circuits in the sleep mode according to the received trigger signal W3, so that the circuits switch from the sleep mode to an operating state. The processing circuit generates the first image signal S1 and the control signal C1 in the operating state.

Figure 6:
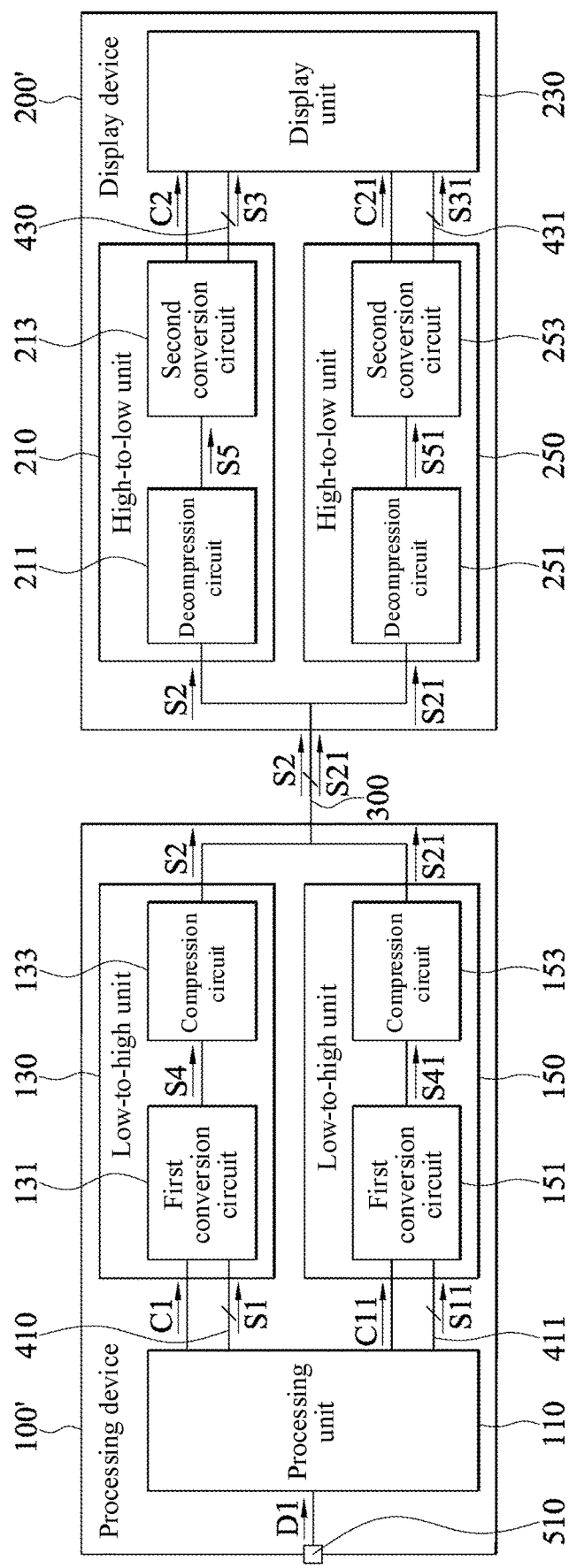
FIG. 6 is a schematic block diagram of another embodiment of the split-type display system according to the present disclosure.

In some embodiments, referring to FIG. 6 in conjunction with FIG. 2, FIG. 3, and FIG. 5, a processing device 100' may include a plurality of low-to-high units, and a display device 200' may include a plurality of high-to-low units. Numbers of low-to-high units and high-to-low units are not limited in the present disclosure. The processing device 100' includes two low-to-high units 130, 150, and the display device 200' includes two high-to-low units 210, 250. The first channel 411 is coupled between the processing unit 110 and the low-to-high unit 150, and the third channel 431 is coupled between the display unit 230 and the high-to-low unit 250. The low-to-high unit 150 includes a first conversion circuit 151 and a compression circuit 153, and the high-to-low unit 250 includes a decompression circuit 251 and a second conversion circuit 253. Operations between the low-to-high unit 150 and the high-to-low unit 250 and the processing unit 110, the transmission cable 300, and the display unit 230 are similar to those of the low-to-high unit 130 and the high-to-low unit 210 in the above embodiments, and therefore an embodiment is listed below for brief description.

As shown in FIG. 6, the processing unit 110 may simultaneously generate a plurality of image signals and a plurality of control signals. The plurality of image signals are used to display a image on the display unit 230, and the plurality of control signals are used to adjust a display effect of the display unit 230. The processing unit 110 generates a first image signal S11 and a control signal C11, and transmits the first image signal S11 and the control signal C11 to the low-to-high unit 150. The first image signal S11 and the first channel 411 have the same first channel number, and the first image signal S11 has a first transmission rate that is substantially the same as that of the first image signal S1. The first conversion circuit 151 in the low-to-high unit 150 merges and converts the control signal C11 and the first image signal S11 into a fourth image signal S41. The fourth image signal S41 has a fourth transmission rate that is substantially the same as that of the fourth image signal S4, and the fourth transmission rate of the fourth image signal S41 is greater than the first rate of the first image signal S11. The first conversion circuit 151 transmits the converted fourth image signal S41 to the compression circuit 153. The compression circuit 153 compresses the fourth image signal S41 into a second image signal S21. The second image signal S21 has a second transmission rate that is substantially the same as that of the second image signal S2. The second transmission rate of the second image signal S21 is greater than the fourth transmission rate of the fourth image signal S41. The transmission cable 300 further includes another second channel corresponding to the second image signal S21. The second channel corresponding to the second image signal S21 has the same second channel number as the second channel corresponding to the second image signal S2. The compression circuit 153 transmits the second image signal S21 to the high-to-low unit 250 through the second channel corresponding to the second image signal S21.

After the high-to-low unit 250 receives the second image signal S21, the decompression circuit 251 in the high-to-low unit 250 decompresses the second image signal S21 into a fifth image signal S51. The fifth image signal S51 has a fifth transmission rate that is substantially the same as that of the fifth image signal S5. The fifth image signal S51 corresponds to the fourth image signal S41. The fifth transmission rate of the fifth image signal S51 is lower than the second transmission rate of the second image signal S21. The decompression circuit 251 transmits the decompressed fifth image signal S51 to the second conversion circuit 253. The second conversion circuit 253 converts the transmission rate of the fifth image signal S51, and captures the fifth image signal S51 to obtain the control signal C21 and a third image signal S31. The third image signal S31 has a third transmission rate that is substantially the same as that of the third image signal S3. The third image signal S31 corresponds to the first image signal S11, the control signal C21 corresponds to the control signal C11, and the control signal C21 is substantially the same as the control signal C11. The high-to-low unit 250 transmits the control signal C21 and the third image signal S31 to the display unit 230. A transmission path of the control signal C21 between the high-to-low unit 250 and the display unit 230 is also different from the third channel. The display unit 230 adjusts the display effect according to the control signal C21 and displays the third image signal S31. Alternatively, the display unit 230 may display the third image signal S31 according to the control signal C21.

In some embodiments, the standby circuit 111 may be coupled to the low-to-high unit 150. The display unit 230 receives at least one wake-up signal from a WIFI antenna, a microphone, a remote control, or a button on the display device 200, the high-to-low unit 250 integrates the at least one wake-up signal from different sources into another integrated signal, and the display unit 230 transmits the another integrated signal to the high-to-low unit 210 or the high-to-low unit 250. For example, the display unit 230 transmits the another integrated signal to the transmission cable 300 through the high-to-low unit 250, and the another integrated signal is transmitted to the processing device 100' through the fourth channel of the transmission cable 300. The low-to-high unit 150 of the processing device 100' converts the another integrated signal into another trigger signal. The another trigger signal corresponds to the above wake-up signals from different sources. The standby circuit 111 and the low-to-high unit 150 further include another fifth channel therebetween, and the low-to-high unit 130 transmits the another trigger signal to the standby circuit 111 according to a transmission channel in the another fifth channel corresponding to the signal source, and the standby circuit 111 wakes up a circuit in a sleep mode according to the received another trigger signal. The circuit switches from the sleep mode to an operating state, and the processing unit 110 in the operating state generates the first image signals S1 and S11 and the control signals C1 and C11.

In some embodiments, the image signals S1, S2, S3, S4, S5, S11, S21, S31, S41, and S51 each include image data and audio information. In some embodiments, the low-to-high units 130 and 150 and the high-to-low units 210 and 250 may be software, hardware, firmware, or combined logic circuits. The processing unit 110 may be an embedded controller (EC), an application integrated circuit (ASIC), or a system on a chip (SOC). The display unit may be a liquid crystal display (LCD) or a light emitting diode (LED).

In conclusion, in some embodiments, a low-to-high unit is disposed on the processing device of the split-type display system, and a high-to-low unit is disposed on the display device. The low-to-high unit converts the transmission rate of the image signal and compresses the image signal to increase the transmission rate of the image signal, so that the channel number of the transmission cable can be reduced, thereby avoiding inconvenience to a user and costs of the transmission cable as a result of an excessively thick transmission cable, and avoiding distortion of the image signal as a result of energy loss during transmission caused by an excessively long transmission cable. Through the high-to-low unit, the image signal received from the transmission cable can be decompressed and the transmission rate can be converted to reduce the transmission rate of the image signal, so that the display unit can display the image signal smoothly. In addition, by disposing the plurality of high-to-low units and the plurality of low-to-high units, the transmission efficiency of the image signal can be improved, and more image signals can be transmitted, thereby providing image display with higher resolution.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A split-type display system, comprising:
   a transmission cable disposed outside a first housing and a second housing, comprising a fixed channel number of channels;
   a processing device disposed inside a first housing, the processing device comprising:
      a processing unit configured to generate a first image signal, wherein the first image signal has a first transmission rate and a first channel number and the first number is greater than the fixed channel number of the transmission cable; and
      a low-to-high unit configured to convert the first image signal into a second image signal, wherein the second image signal has a second transmission rate and a second channel number, the first transmission rate is lower than the second transmission rate, and wherein the second channel number is substantially the same as the fixed channel number of the transmission cable;
   a display device disposed inside a second housing, the second housing being distinct and separated from the first housing, comprising:
      a high-to-low unit configured to receive and convert the second image signal into a third image signal, wherein the third image signal has a third transmission rate and a third channel number, wherein the third transmission rate is lower than the second transmission rate; and
      a display unit configured to receive the third image signal with the third transmission rate and thereby display the third image signal;
   wherein the transmission cable is configured to connect the low-to-high unit to the high-to-low unit.

2. The split-type display system according to claim 1, wherein the first channel number divided by the second channel number is a ratio, and the second transmission rate divided by the first transmission rate is the ratio; and the third channel number divided by the second channel number is the ratio, and the second transmission rate divided by the third transmission rate is the ratio.

3. The split-type display system according to claim 2, wherein the processing unit generates a control signal, the low-to-high unit merges and converts the first image signal and the control signal into the second image signal, the high-to-low unit converts and captures the second image signal to obtain the third image signal and the control signal, and the display unit is configured to display the third image signal according to the captured control signal.

4. The split-type display system according to claim 1, wherein the low-to-high unit comprises a first conversion circuit and a compression circuit, the first conversion circuit converts the first image signal into a fourth image signal, the fourth image signal has a fourth transmission rate, the fourth transmission rate is greater than the first transmission rate, the compression circuit compresses the fourth image signal into the second image signal, and the second transmission rate is greater than the fourth transmission rate; and the high-to-low unit comprises a decompression circuit and a second conversion circuit, the decompression circuit decompresses the second image signal into a fifth image signal, the fifth image signal has a fifth transmission rate, the fifth transmission rate is lower than the second transmission rate, the second conversion circuit converts the fifth image signal into the third image signal, and the third transmission rate is lower than the fifth transmission rate.

5. The split-type display system according to claim 4, wherein the processing unit generates a control signal, and the first conversion circuit merges and converts the first image signal and the control signal into the fourth image signal; and the second conversion circuit converts and captures the fifth image signal to obtain the third image signal and the control signal, and the display unit is configured to display the third image signal according to the captured control signal.

6. The split-type display system according to claim 5, wherein the first conversion circuit merges the first image signal and the control signal according to a merging mode, and the merging mode is a time sharing mode, a space sharing mode, or a time and space sharing mode.

7. The split-type display system according to claim 1, wherein the display device receives and transmits a wake-up signal to the high-to-low unit, the high-to-low unit converts the wake-up signal into an integrated signal, the integrated signal has a fourth channel number, the channel number of the transmission cable corresponds to the second channel number and the fourth channel number, the low-to-high unit converts the integrated signal into a wake-up control signal, and transmits the wake-up control signal to the processing unit, the wake-up control signal has a fifth channel number, the fifth channel number is greater than or equal to the fourth channel number, and the processing unit switches to an operating state after receiving the wake-up control signal.

8. The split-type display system according to claim 1, wherein a length of the transmission cable is greater than 50 centimeters.

9. A split-type display system, comprising:
a processing device disposed inside a first housing, the processing device comprising:
a processing unit configured to generate a plurality of first image signals, wherein each of the first image signals has a first transmission rate and a first channel number; and a plurality of low-to-high units corresponding to the first image signals in a one-to-one manner, wherein each of the low-to-high units is configured to convert a corresponding one of the first image signals into a second image signal, each of the second image signals has a second transmission rate and a second channel number, each of the first transmission rates is lower than each of the second transmission rates, and each of the first channel numbers is greater than each of the second channel numbers;
a display device disposed inside a second housing, the second housing being distinct and separated from the first housing, comprising:
a plurality of high-to-low units corresponding to the low-to-high units m a one-to-one manner, wherein each of the high-to-low units is configured to receive the second image signal from a corresponding one of the low-to-high units, and convert the second image signal into a third image signal, and each of the third image signals has a third transmission rate and a third channel number;
a display unit configured to display the third image signals; and
a transmission cable disposed outside the first housing and outside the second housing configured to connect the low-to-high units to the high-to-low units, wherein the transmission cable comprises a fixed number of channels, such that the fixed number of channels of the transmission cable corresponds to a sum of the second channel numbers of the second image signals.

10. The split-type display system according to claim 9, wherein each of the first channel numbers divided by each of the second channel numbers is a ratio, and each of the second transmission rates divided by each of the first transmission rates is the ratio; and each of the third channel numbers divided by each of the second channel numbers is the ratio, and each of the second transmission rates divided by each of the third transmission rates is the ratio.

11. The split-type display system according to claim 10, wherein the processing unit generates a plurality of control signals, each of the low-to-high units merges and converts a corresponding one of the first image signals and the corresponding one of the control signals into the second image signal, each of the high-to-low units converts and captures, according to the second image signal transmitted by the corresponding one of the low-to-high units, the second image signal to obtain the third image signal and the control signal, and the display unit is configured to display the third image signals according to the captured control signals.

12. The split-type display system according to claim 9, wherein each of the low-to-high units comprises a first conversion circuit and a compression circuit, each of the first conversion circuits converts the received corresponding one of the first image signals into a fourth image signal, each of the fourth image signals has a fourth transmission rate, each of the fourth transmission rates is greater than each of the first transmission rates, each of the compression circuits compresses the fourth image signal transmitted by a corresponding one of the first conversion circuits into the second image signal, and each of the second transmission rates is greater than each of the fourth transmission rates; and
each of the high-to-low units comprises a decompression circuit and a second conversion circuit, each of the decompression circuits decompresses the second image signal into a fifth image signal according to the second image signal transmitted by a corresponding one of the compression circuits, each of the fifth image signals has a fifth transmission rate, each of the fifth transmission rates is lower than each of the second transmission rates, each of the second conversion circuits captures the fifth image signal transmitted by a corresponding one of the decompression circuits into the third image signal, and each of the third transmission rates is lower than each of the fifth transmission rates.

13. The split-type display system according to claim 12, wherein the processing unit generates a plurality of control signals, and each of the first conversion circuits merges and converts the corresponding one of the first image signals and a corresponding one of the control signals into the fourth image signal; and
each of the second conversion circuits converts and captures, according to the fifth image signal transmitted by the corresponding one of the decompression circuits, the fifth image signal to obtain the third image signal and the control signal, and the display unit is configured to display the third image signals according to the captured control signals.

14. The split-type display system according to claim 13, wherein the first conversion circuit merges the first image signal and the control signal according to a merging mode, and the merging mode is a time sharing mode, a space sharing mode, or a time and space sharing mode.

15. The split-type display system according to claim 9, wherein the display device receives and transmits a plurality of wake-up signals to the high-to-low units respectively, each of the high-to-low units converts a corresponding one of the wake-up signals into an integrated signal, each of the integrated signals has a fourth channel number, the channel number of the transmission cable corresponds to a sum of the second channel numbers and the fourth channel numbers, each of the low-to-high units converts, according to the integrated signal transmitted by a corresponding one of the high-to-low units, the integrated signal into a wake-up control signal and transmits the wake-up control signal to the processing unit, each of the wake-up control signals has a fifth channel number, the fifth channel number is greater than or equal to the fourth channel number, and the processing unit switches to an operating state after receiving the wake-up control signals.

16. The split-type display system according to claim 9, wherein a length of the transmission cable is greater than 50 centimeters.

\* \* \* \* \*